(12) United States Patent
Messing

(10) Patent No.: US 11,441,537 B2
(45) Date of Patent: Sep. 13, 2022

(54) METHOD FOR CONTROLLING A WIND TURBINE AND WIND TURBINE

(71) Applicant: Wobben Properties GmbH, Aurich (DE)

(72) Inventor: Ralf Messing, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/962,033

(22) PCT Filed: Jan. 15, 2019

(86) PCT No.: PCT/EP2019/050929
§ 371 (c)(1),
(2) Date: Jul. 14, 2020

(87) PCT Pub. No.: WO2019/138132
PCT Pub. Date: Jul. 18, 2019

(65) Prior Publication Data
US 2020/0400122 A1 Dec. 24, 2020

(30) Foreign Application Priority Data
Jan. 15, 2018 (DE) .................. 10 2018 100 727.2

(51) Int. Cl.
*F03D 7/02* (2006.01)

(52) U.S. Cl.
CPC ......... *F03D 7/0224* (2013.01); *F03D 7/0276* (2013.01); *F05B 2260/71* (2013.01);
(Continued)

(58) Field of Classification Search
CPC ..... F03D 7/0224; F03D 7/0276; Y02E 10/72; F05B 2260/71; F05B 2270/20;
(Continued)

(56) References Cited

U.S. PATENT DOCUMENTS 7,420,289 B2 * 9/2008 Wang .................. F03D 17/00
290/44
7,629,702 B2 * 12/2009 Schubert .............. F03D 7/042
290/44
(Continued)

FOREIGN PATENT DOCUMENTS

DE 102013100387 A1 7/2013
GB 2542343 A 3/2017
(Continued)

*Primary Examiner* — Pedro J Cuevas
(74) *Attorney, Agent, or Firm* — Seed Intellectual Property Law Group LLP

(57) ABSTRACT

A method for controlling a wind turbine and an associated wind turbine. The wind turbine is operated according to an operating point, wherein the operating point is determined at least by a pitch angle and a tip speed ratio, wherein one of the operating points corresponds to a maximum power coefficient, wherein, in a partial load range, the wind turbine is operated at an operating point which differs from the operating point with the maximum power coefficient. The distance of the operating point from the operating point with the maximum power coefficient is set in accordance with a measured turbulence measure.

14 Claims, 6 Drawing Sheets

(52) U.S. Cl.
CPC ....... *F05B 2270/20* (2013.01); *F05B 2270/32* (2013.01); *F05B 2270/322* (2013.01); *F05B 2270/327* (2013.01); *F05B 2270/328* (2013.01); *F05B 2270/335* (2013.01); *Y02E 10/72* (2013.01)

(58) Field of Classification Search
CPC ............ F05B 2270/32; F05B 2270/322; F05B 2270/327; F05B 2270/328; F05B 2270/335
USPC ...................................................... 290/44, 55
See application file for complete search history.

(56) References Cited

U.S. PATENT DOCUMENTS

| | | | |
|---|---|---|---|
| 7,948,104 B2* | 5/2011 | Andersen | F03D 7/0264 290/44 |
| 8,441,138 B2* | 5/2013 | Gjerlov | F03D 7/043 290/44 |
| 8,779,611 B2* | 7/2014 | Kabatzke | F03D 7/0276 290/44 |
| 9,201,410 B2* | 12/2015 | Ambekar | G05B 13/04 |
| 9,551,322 B2* | 1/2017 | Ambekar | F03D 7/045 |
| 9,587,628 B2 | 3/2017 | Narayana et al. | |
| 9,863,402 B2* | 1/2018 | Perley | F03D 7/028 |
| 10,036,692 B2* | 7/2018 | Perley | F03D 17/00 |
| 10,107,261 B2* | 10/2018 | Zheng | F03D 17/00 |
| 10,240,580 B2* | 3/2019 | Enevoldsen | F03D 7/0224 |
| 10,240,583 B2* | 3/2019 | Yang | F03D 7/0276 |
| 10,371,124 B2* | 8/2019 | Wilson | F03D 7/048 |
| 10,473,088 B2* | 11/2019 | Movsichoff | F03D 7/0276 |
| 10,697,439 B2* | 6/2020 | Wheeler | G01M 15/14 |
| 10,774,811 B2* | 9/2020 | Davoust | F03D 17/00 |
| 10,823,145 B2* | 11/2020 | Zhou | F03D 7/0292 |
| 11,125,215 B2* | 9/2021 | Enevoldsen | F03D 17/00 |
| 11,193,470 B2* | 12/2021 | Messing | F03D 7/0224 |
| 2007/0216166 A1* | 9/2007 | Schubert | F03D 7/0224 290/55 |
| 2008/0140263 A1* | 6/2008 | Wang | F03D 17/00 700/291 |
| 2009/0295160 A1 | 12/2009 | Wittekind et al. | |
| 2010/0274400 A1* | 10/2010 | Ormel | F03D 7/043 700/287 |
| 2010/0283245 A1* | 11/2010 | Gjerlov | F03D 7/043 290/44 |
| 2012/0165996 A1 | 6/2012 | Olesen | |
| 2013/0140819 A1* | 6/2013 | Abdallah | F03D 7/046 290/44 |
| 2013/0166082 A1* | 6/2013 | Ambekar | F03D 7/028 700/287 |
| 2014/0193254 A1 | 7/2014 | Gopolan et al. | |
| 2015/0093242 A1* | 4/2015 | Enevoldsen | F03D 7/0224 416/1 |
| 2015/0176569 A1 | 6/2015 | Karikomi et al. | |
| 2015/0267686 A1* | 9/2015 | Kjær et al. | F03D 7/0272 290/44 |
| 2015/0308416 A1* | 10/2015 | Ambekar | F03D 17/00 700/287 |
| 2016/0138571 A1* | 5/2016 | Perley | F03D 17/00 702/42 |
| 2016/0177914 A1* | 6/2016 | Enevoldsen | F03D 1/0633 416/228 |
| 2016/0230741 A1* | 8/2016 | Brath | F03D 17/00 |
| 2016/0237988 A1* | 8/2016 | Perley | F03D 7/047 |
| 2016/0265509 A1* | 9/2016 | Movsichoff | F03D 7/028 |
| 2016/0305403 A1* | 10/2016 | Zheng | F03D 7/0224 |
| 2017/0241405 A1* | 8/2017 | Kruger | F03D 7/048 |
| 2017/0268487 A1* | 9/2017 | Yang | G05B 19/048 |
| 2017/0335827 A1* | 11/2017 | Wilson | F03D 7/048 |
| 2018/0320664 A1* | 11/2018 | Zhou | F03D 7/0292 |
| 2018/0363632 A1* | 12/2018 | Wheeler | F03D 7/043 |
| 2019/0338755 A1* | 11/2019 | Davoust | F03D 7/046 |
| 2019/0368470 A1* | 12/2019 | Enevoldsen | F03D 13/30 |
| 2020/0400121 A1* | 12/2020 | Lehn | F03D 7/0276 |
| 2021/0190038 A1* | 6/2021 | Messing | F03D 7/0224 |
| 2021/0231101 A1* | 7/2021 | Messing | F03D 7/0224 |
| 2021/0340946 A1* | 11/2021 | Messing | F03D 1/0675 |
| 2021/0355912 A1* | 11/2021 | Messing | F03D 7/028 |
| 2021/0396209 A1* | 12/2021 | Bott | F03D 7/0224 |
| 2021/0396211 A1* | 12/2021 | De Bot | F03D 7/0276 |
| 2022/0034296 A1* | 2/2022 | Messing | F03D 7/0292 |

FOREIGN PATENT DOCUMENTS

| | | |
|---|---|---|
| WO | 2011/150931 A2 | 12/2011 |
| WO | 2011/157271 A2 | 12/2011 |
| WO | 2017/000953 A1 | 1/2017 |

* cited by examiner

METHOD FOR CONTROLLING A WIND TURBINE AND WIND TURBINE

BACKGROUND

Technical Field

The present invention relates to a method for controlling a wind turbine and to a corresponding wind turbine.

Description of the Related Art

A partial load range is an operating range of a wind turbine in which the wind, in particular, is not blowing strongly enough to achieve a rated power level of the wind turbine power. A wind turbine is usually operated in a partial load range in such a way that a tip speed ratio λ, that is to say a ratio between the circumferential speed of the rotor and the wind speed, remains virtually constant over the entire partial load range by virtue of the fact that the rotational speed of the system is set in a flexible way. A pitch angle γ is usually not changed in the partial load range.

In FIGS. 2a and 2b, profiles of the tip speed ratio λ, cf., FIG. 2a, and of the pitch angle γ, cf., FIG. 2b, are plotted schematically against the wind speed v. In a partial load range 200, both the tip speed ratio λ and the pitch angle γ are independent of the wind speed v. In these examples, in a full load range 210, the tip speed ratio λ decreases as the wind speed v increases, while the pitch angle γ rises as the wind speed v increases. The wind turbine then ultimately also reaches the rated power level in the full load range 210. It should be borne in mind that extreme winds, which could, for example, cause the wind turbine to be switched off, are not outlined in the schematic FIGS. 2a and 2b.

It is known that, for a specific value of the tip speed ratio λ, an optimum power coefficient $c_p$ can be achieved at a constant pitch angle γ. The profile of the power coefficient $c_p$ plotted against the tip speed ratio λ at a constant pitch angle γ is shown schematically in FIG. 3. A specific value of the tip speed ratio λ can then be selected as an operating point of the wind turbine, wherein, in general, it is desired to maximize the power which can be achieved. Nevertheless, in general, an operating point 310 at which the optimum power coefficient $c_p$ is reached is not selected but rather an operating point 320 which is shifted to the right, that is to say toward relatively high tip speed ratios, by a tip speed ratio Δλ.

It should be noted that this selection of the operating point is dependent on the configuration of the rotor blade and the mode of operation of the system and is possible, in particular, in a strong wind system with large blade depths. It can also be possible to operate at the operating point 320 with weak wind systems with small blade depths if there are no limitations with respect to noise in the partial load range, since, with such rotor blades, the maximum power coefficient migrates toward relatively high tip speed ratios, and overall a relatively loud noise is therefore to be expected as result of the operation at tip speed ratios to the right of the maximum.

Since the system is not operated at the optimum of the power coefficient, that is to say the operating point 310, but rather at a relatively high tip speed ratio to the right thereof by distance equaling the tip speed ratio Δλ, turbulence of the incoming flow is allowed for. The term turbulence denotes fluctuations in the wind speed about an average wind speed in the incoming flow and can be expressed quantitatively as turbulence intensity. Such variations in the incoming flow speed on a timescale significantly below the duration of one rotation of the rotor are not perceived owing to the inertia of the system control by the rotor so that the variations in the wind speed become manifest as a variation in the tip speed ratio, since the rotational speed, or blade tip speed, does not change on the timescale of the variations of the inflowing wind speed. Accordingly, the tip speed ratio drops as a consequence of a gust of wind which brings about an increase in the wind speed. It is therefore known that the system is operated on the right, that is to say at relatively high tip speed ratios, so that gusts of wind with resulting reduced tip speed ratios are associated with an improved power coefficient near to the optimum. The core idea is that the inflowing wind angle does not increase as a result of the gust of wind such that the flow can be detached from the rotor blade, which entails considerably disadvantageous consequences for the energy yield.

The German Patent and Trademark Office has made searches in the following prior art in the priority application for the present application: DE 10 2013 100 387 A1, GB 2 542 343 A, US 2009/0295160 A1, US 2012/0165996 A1, US 2014/0193254 A1, US 2015/0176569 A1, WO 2011/157271 A2, WO 2017/000953 A1.

BRIEF SUMMARY

Against this background of known control strategies of wind turbines further optimization of the power yield in the partial load range is desired.

According to a first aspect, provided is a method of the type specified at the beginning by virtue of the fact that the distance of the operating point from the operating point with the maximum power coefficient is set in accordance with a measured turbulence measure.

In particular, provided is a method for controlling a wind turbine, wherein the wind turbine is operated according to an operating point. The operating point is determined at least by a pitch angle and a tip speed ratio, wherein one of the operating points corresponds to a maximum power coefficient. In a partial load range, the wind turbine is operated at an operating point which differs from the operating point with the maximum power coefficient.

Since the distance of the operating point from the operating point with the maximum power coefficient is not constant, but rather is set in accordance with a turbulence measure, it can be prevented that an unnecessarily large distance from the operating point with the maximum power coefficient is selected. The distance between the selected operating point and the operating point with the maximum power coefficient can accordingly be as low as necessary in order to permit safe operation of the wind turbine with a maximum power yield. In addition, the turbulence measure is not merely simulated in some way but rather, by virtue of the fact that the turbulence is measured, the turbulence measure reflects the actual state of the wind turbine. The adaptation of the distance is accordingly carried out by taking into account the actually prevailing conditions.

It is therefore provided that, in the partial load range, the operating point, in particular therefore the selection of the tip speed ratio and of the pitch angle in the partial load range, is adapted in accordance with the measured turbulence measure. The wind turbine preferably has a corresponding measuring system for this, which is capable of determining, in particular in real time, the turbulence measure and of correspondingly controlling the wind turbine in real time on the basis of the measured turbulence measure.

It is preferably proposed that a turbulence intensity be considered as a turbulence measure.

The turbulence of the wind can be described by the turbulence intensity TI:

$$TI = \frac{\sigma_u}{\overline{U}}. \quad \text{[Eq. 1]}$$

The standard deviation $\sigma_u$ is defined as follows:

$$\sigma_u = \sqrt{\frac{1}{T}\int_0^T (u-\overline{U})^2 dt}, \quad \text{[Eq. 2]}$$

with the wind speed $\overline{U}$ averaged over the time period T:

$$\overline{U} = \frac{1}{T}\int_0^T u\, dt. \quad \text{[Eq. 3]}$$

In order to describe non-steady-state flows u, the fluctuation $\tilde{u}$ is usually superimposed on the average speed:

$$u = \overline{U} + \tilde{u} \quad \text{[Eq. 4]}$$

The turbulence intensity therefore reflects the standard deviation of the wind speed with respect to the wind speed which is averaged over a relatively long time period, for example 10 minutes. As a result, a measure is given as to how strong the superimposed fluctuation is with respect to wind speed. This turbulence intensity is, in this respect, a measure of the strength of the fluctuations of the wind, which fluctuations can represent additional loading of the wind turbine.

In addition to the turbulence intensity, it is, of course, also possible to use other measurable turbulence measures alternatively or additionally.

In one preferred embodiment, a relatively large measured turbulence measure corresponds to a relatively large distance of the operating point from the operating point with the maximum power coefficient.

The higher the measured turbulence measure, the stronger, for example, the effects of gusts of wind or the like. Accordingly, in this embodiment, when there is a relatively large measured turbulence measure, a relatively large distance, that is to say a relatively high level of safety, is proposed. Correspondingly, a relatively low measured turbulence measure does not require such a large distance so that even relatively small gusts of wind are sufficient to move the tip speed ratio close to the operating point with the maximum power coefficient.

However, in other embodiments, in a precisely converse fashion it is possible for a relatively large measured turbulence measure to signify a smaller absolute distance of the operating point from the operating point with the maximum power coefficient. This is appropriate, in particular, for the case in which the wind turbine is operated to the left of the operating point with the maximum power coefficient, i.e., in particular at relatively low tip speed ratios. As a result, when there is a relatively large turbulence measure, a relatively high tip speed ratio is also selected, with the advantageous aspects mentioned above. This operation takes place, for example, with narrow rotor blades.

It should be borne in mind that the distance within the scope of this disclosure is basically to be understood as an absolute value of the distance. If a sign convention is expressly used, then a distance is to be considered positive if the operating point lies to the right of the operating point with the maximum power coefficient. Correspondingly, negative distances are present when the operating point is to the left of the maximum.

If, in one embodiment, the wind turbine is operated to the left of the operating point with the maximum power coefficient, i.e., with a negative distance, in this embodiment, the increase in the distance can also have the result that, given a correspondingly large measured turbulence measure, the wind turbine is ultimately operated at the operating point, or even to the right of the operating point, with the maximum power coefficient. The disclosure is not limited in this respect to the examples and other relationships between the selected distance and the measured turbulence measure are also to be expressly take into account.

In one preferred embodiment, the distance between the operating point and the operating point with the maximum power coefficient is also set in accordance with a degree of rotor blade soiling.

It is also a realization that the position and migration of the operating point with a maximum power coefficient depend to a great extent on the degree of rotor blade soiling. Accordingly, a further increase in the yield is possible by taking into account the degree of rotor blade soiling for the setting of the distance.

In one preferred embodiment, the pitch angle and/or the tip speed ratio of the operating point are/is increased in comparison with the operating point with the maximum power coefficient.

Accordingly, with reference to FIG. 3 which has already been discussed, the operating point to the right of the operating point with the maximum power coefficient is set. This makes it possible that, owing to the inertia of the rotor, the occurrence of a gust of wind causes the tip speed ratio to drop and accordingly leads to operation closer to the optimal operating point without the risk of separation of the flow.

Likewise, in other preferred embodiments there is provision to reduce the pitch angle and/or the tip speed ratio of the operating point in comparison with the operating point with the maximum power coefficient. Accordingly, in these embodiments, the wind turbine is operated to the left of the operating point with a maximum power coefficient. The selection is preferably made in accordance with the rotor blade geometry, wherein the operation to the left of the operating point with a maximum power coefficient has proven favorable, in particular, for narrow rotor blades. Operation can also only be possible to the left of the operating point with a maximum power coefficient, for example, owing to noise limitations and/or generally in weak wind systems.

In one preferred embodiment, the tip speed ratio is increased by means of the control of the rotational speed and/or of the torque.

Controlling the tip speed ratio by means of the control of the rotational speed and/or of the torque is, of course, only one of the possible embodiments for controlling the tip speed ratio. Other possible ways of influencing the tip speed ratio can also be advantageously used.

In one preferred embodiment, the power coefficient is improved when a gust of wind occurs.

Since the power coefficient improves when a gust of wind occurs, the instantaneous yield and therefore, as a result, also the annual energy yield can be improved. At the same time, the loads on the wind turbine are kept as low as possible by virtue of the fact that the power coefficient is improved and accordingly lies closer to the optimum power coefficient.

In one preferred embodiment, the turbulence measure is measured essentially in real time.

By virtue of the fact that the turbulence measure is measured essentially in real time, it is made possible for the wind turbine to adjust to the measured turbulence measure. Corresponding measuring systems such as, for example, the blade vision system are preferably provided for this, even though other systems which are suitable for measuring a turbulence measure can also be used.

In one preferred embodiment, 15-second mean values of the turbulence measure are made available essentially in real time.

15-second mean values have proven valuable as an empirical value which suppresses both high-frequency and less relevant fluctuations, but at the same time does not take into account definitive information about general changes in the wind situations, for example an increasing wind. In particular, 15-second mean values are particularly informative for evaluating the strength of gusts of wind. Likewise, it is, however, also of course possible to determine relatively long or relatively short durations of the turbulence measure.

In one preferred embodiment, the method also comprises controlling the wind turbine in accordance with a measured wind shear.

A wind shear is understood to mean different wind directions or wind speeds at different locations or regions, in particular, of the rotor. A vertical wind shear is particularly prominent, and indicates generally that wind high up is stronger than in the vicinity and is under the influence of the ground. A strong wind shear, i.e., markedly different wind situations at different positions of the rotor blades over the rotation of the rotor can give rise to high system loads and also entail the risk that the rotor blade moves into flow separation as a result of excessively high attitude angles. The wind shear can be measured and determined, for example, on the basis of the loads occurring over the circumference of the rotor or else also by means of wind sensors which measure the wind at different regions on the rotor plane.

In one preferred embodiment, the wind turbine is controlled in accordance with the measured wind shear and the measured turbulence measure taking into account the time of day.

It is known that day and night have an influence on both the turbulence and the wind shear. However, the effect is diametrical, that is to say, while the turbulence intensity is usually greater during the day than during the night, the opposite is generally true in the case of shearing. That is to say at night generally greater wind shear is found than in the day. Accordingly, the wind turbine, which is controlled not only by the turbulence measure and the wind shear but also in accordance with the time of day, can better categorize the prevailing situation and accordingly operate closer to an optimum value.

In one preferred embodiment, the turbulence measure is measured with spatial resolution over the rotor.

In one preferred embodiment, the operating point is also set taking into account acoustic boundary conditions.

Provided is a wind turbine, wherein the wind turbine is a pitch-controlled wind turbine with a variable rotational speed. The wind turbine comprises a turbulence sensor for measuring a turbulence measure, in particular a turbulence intensity, and a controller for controlling the wind turbine. The controller is configured to operate the wind turbine according to an operating point, wherein the operating point is determined at least by a pitch angle and a tip speed ratio, wherein one of the operating points corresponds to a maximum power coefficient. The controller is configured to operate the wind turbine in a partial load range at an operating point which differs from the operating point with a maximum power coefficient, and to set the distance of the operating point from the operating point with the maximum power coefficient in accordance with the turbulence measure which is measured by the turbulence sensor.

In particular, the wind turbine therefore permits all of the advantages to be achieved which have been explained with reference to the method described above. Likewise, the wind turbine can, according to this aspect, be combined with all of the preferred embodiments of the method according to the invention.

The turbulence sensor can be embodied as any form of suitable sensors which are capable of specifying a measure which is indicative of the turbulence at the rotor blade. For example, the turbulence sensor can measure and make available the turbulence measure directly on the basis of the measured angle or indirectly on the basis of sagging or loading of the rotor blade.

BRIEF DESCRIPTION OF THE SEVERAL VIEWS OF THE DRAWINGS

The invention will be explained in more detail below on the basis of embodiments by way of example with reference to the accompanying figures.

DETAILED DESCRIPTION

Figure 1:
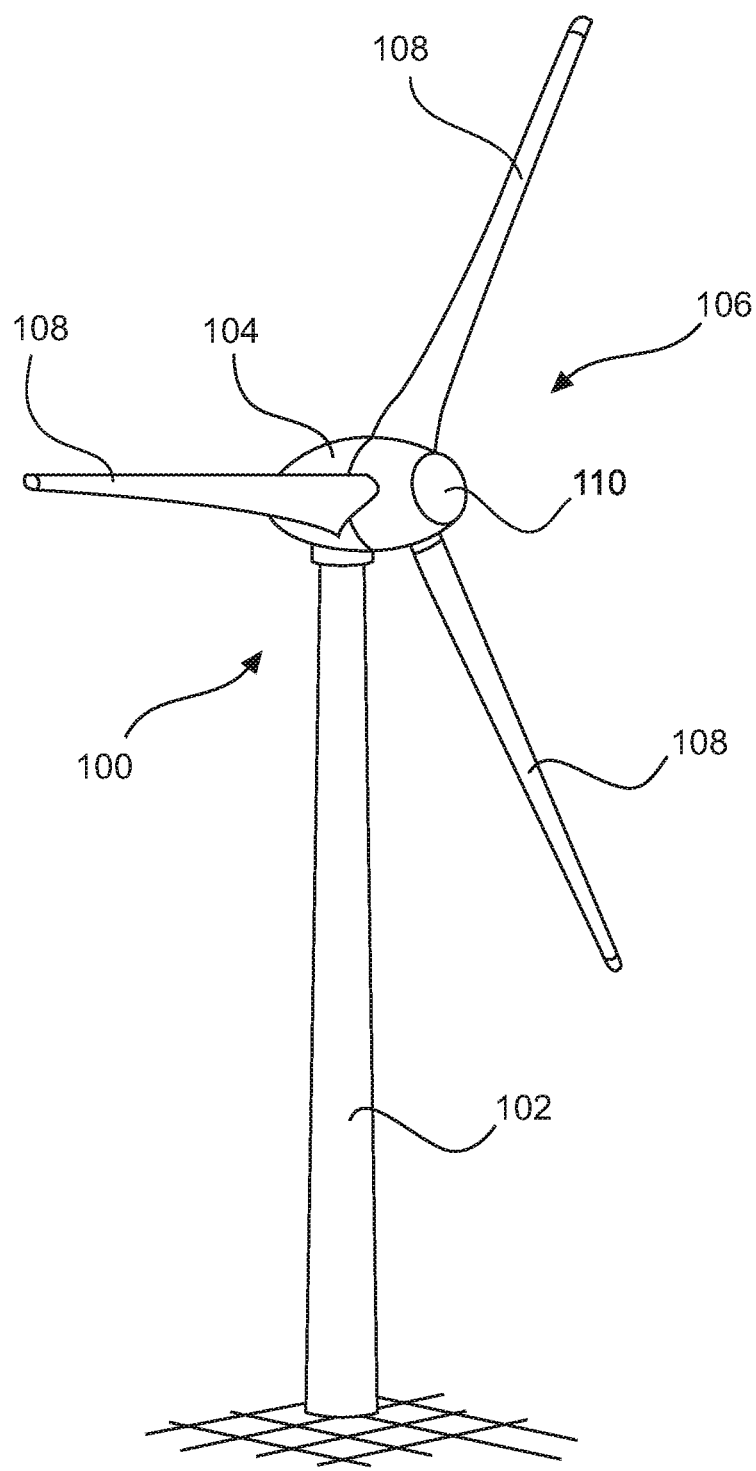
FIG. 1 shows a wind turbine in a schematic illustration.
Figure 2A:
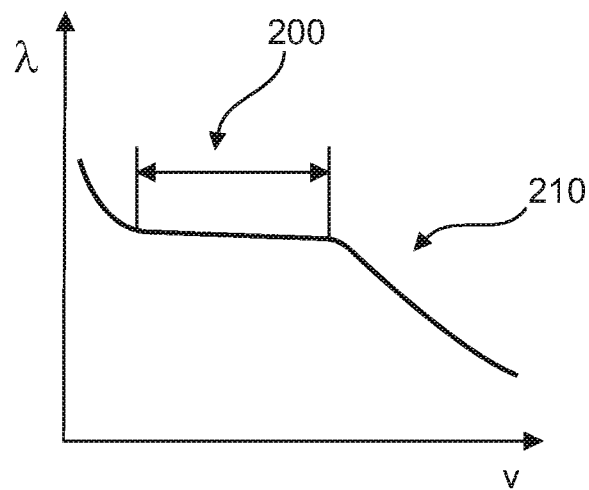
FIG. 2a shows a schematic view of the profile between the tip speed ratio $\lambda$ and wind speed v.
Figure 2B:
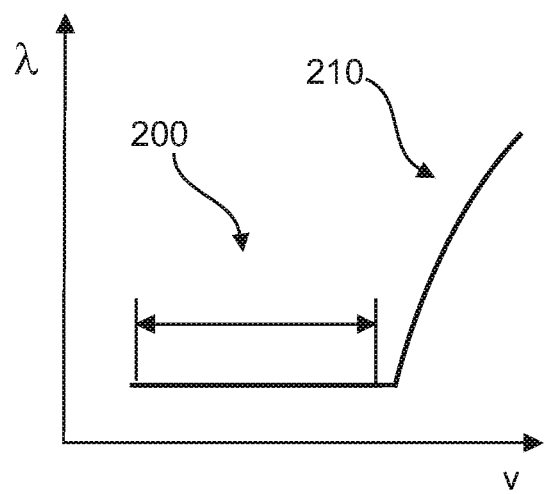
FIG. 2b shows a schematic view of the profile between the pitch angle $\gamma$ and the wind speed v.
Figure 3:
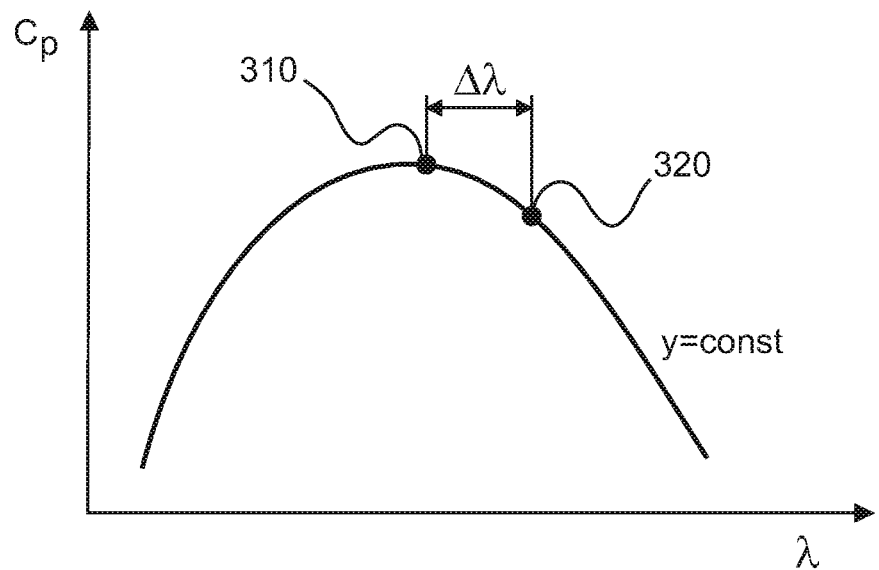
FIG. 3 shows a schematic view of the profile between the power coefficient $c_p$ and tip speed ratio $\lambda$ at a constant pitch angle $\gamma$.

FIG. 1 shows a wind turbine 100 with a tower 102 and a nacelle 104. A rotor 106 with three rotor blades 108 and a spinner 110 is arranged on the nacelle 104. During operation, the rotor 106 is set in a rotational motion by the wind and, as a result, drives a generator in the nacelle 104.

The wind turbine 100 has a measuring system which is suitable for determining a measure of the inflowing turbulence in real time and for correspondingly adjusting the wind turbine 100 in real time according to the measured values.

The wind turbine 100 is configured to adapt the operating point in the partial load range 200, that is to say to select the tip speed ratio and the pitch angle in the partial load range 200, as a function of the turbulence intensity of the incoming flow. In the following, the turbulence intensity Ti defined above is described by way of example as a turbulence measure, wherein, of course, this constitutes only an example and other variables which permit definitive information to be obtained about the extent of the turbulence of the incoming flow are likewise also conceivable.

Figure 4:
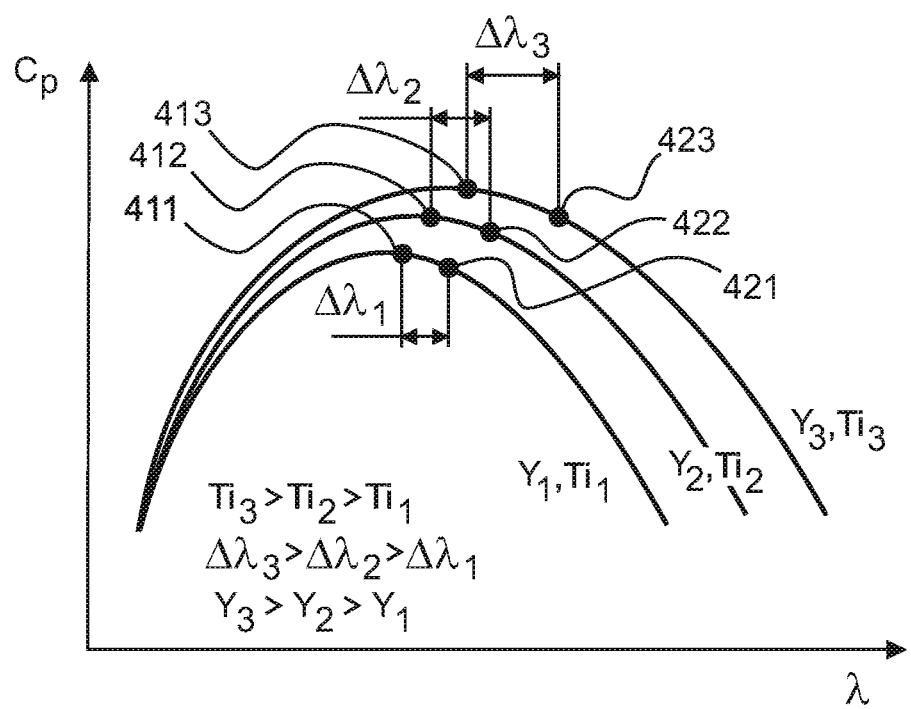
FIG. 4 shows a schematic view of various power coefficient profiles as a function of a turbulence measure.

In FIG. 4, profiles of the power coefficient $c_p$ plotted against the tip speed ratio $\lambda$ are shown for three different turbulence intensities $Ti_1$, $Ti_2$ and $Ti_3$, said profiles each corresponding to a different value of the pitch angle $\gamma_1$, $\gamma_2$ and $\gamma_3$. However, it is essential that different tip speed ratios $\lambda$ with a maximum power coefficient $c_p$ 411, 412 and 413 are obtained for each of the profiles with different turbulence intensities. The operating point at which the wind turbine 100 is operated at the different turbulence intensities $Ti_1$, $Ti_2$ and $Ti_3$ is the operating point 421, 422 and 423 which are each operated a tip speed ratio $\lambda$ which is higher, by a difference $\Delta\lambda_1$, $\Delta\lambda_2$, $\Delta\lambda_3$, than the tip speed ratio which is associated with the maximum power coefficient.

The selection of the distance or of the difference from the operating point with the maximum power coefficient, in this example $\Delta\lambda_1$, $\Delta\lambda_2$, $\Delta\lambda_3$ is in accordance with the measured turbulence measure and not constant. In this example, $Ti_1<Ti_2<Ti_3$ and correspondingly $\Delta\lambda_1<\Delta\lambda_2<\Delta\lambda_3$. In other words, the difference from the operating point with the maximum power coefficient is greater, the greater the measured turbulence measure.

Three effects which play a significant role in the selection of the adapted operating point are described below with reference to FIG. 4.

Firstly, the distance of the operating point from the optimum of the power coefficient $\Delta\lambda$ will therefore already be a function of the turbulence intensity, since, if no inflowing turbulence were present at all, the operating point could be positioned directly at the optimum, that is to say $\Delta\lambda=0$, since then there would be no variation in the tip speed ratio $\lambda$.

Secondly, it is to be borne in mind that the optimum of the power coefficient of the rotor blade basically shifts toward relatively high tip speed ratios and pitch angles under the influence of the inflowing turbulence. This is expressed in FIG. 4 by the fact that the points with the maximum power coefficient $c_p$ 411, 412 and 413 shift to the right as the turbulence intensity Ti increases.

Thirdly, when the turbulence intensities Ti are very high, it may be the case that flow separation can also occur in the partial load range 200, since the effective attitude angles increase as a result of the reduction of the tip speed ratios $\lambda$. This flow separation gives rise to a considerable decrease in performance, which therefore has to be avoided. This is in turn achieved by raising the pitch angle and/or the tip speed ratio.

Figure 5A:
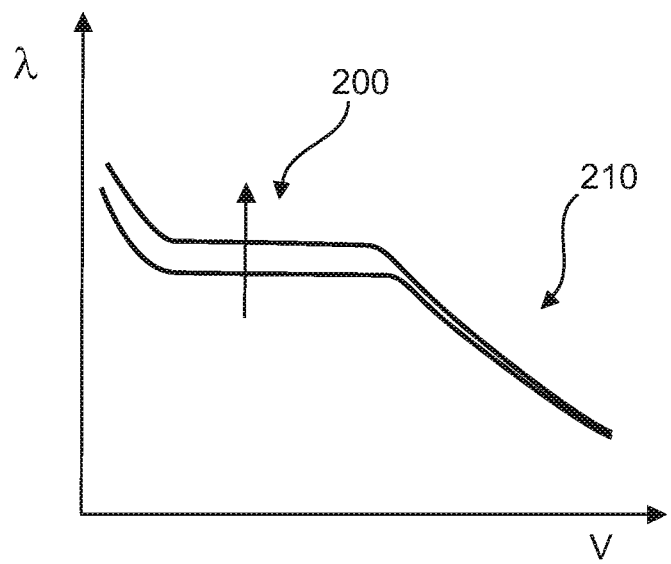
FIG. 5a shows a schematic view of the profile between the tip speed ratio $\lambda$ and wind speed v in the case of a rising turbulence measure.
Figure 5B:
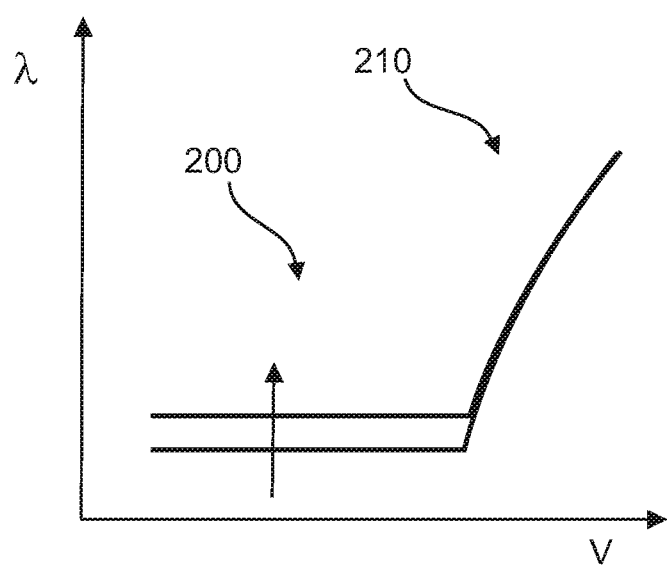
FIG. 5b shows a schematic view of the profile between the pitch angle $\gamma$ and the wind speed v in the case of a rising turbulence measure.

All of the described effects lead to a situation in which adaptation of the tip speed ratio and of the pitch angle in the partial load range is performed in accordance with the turbulence intensity, determined in real time, of the incoming flow, preferably in such a way that, in the case of partial load with increasing turbulence intensity, the tip speed ratio $\lambda$ and/or the pitch angle $\gamma$ adapted, in particular rises as can be seen particularly well in FIGS. 5a and 5b. This is indicated in FIGS. 5a and 5b by the upwardly directed arrow in the partial load range 200, while in the full load range 210 there is no adaptation dependent on the determined turbulence measure.

Figure 6A:
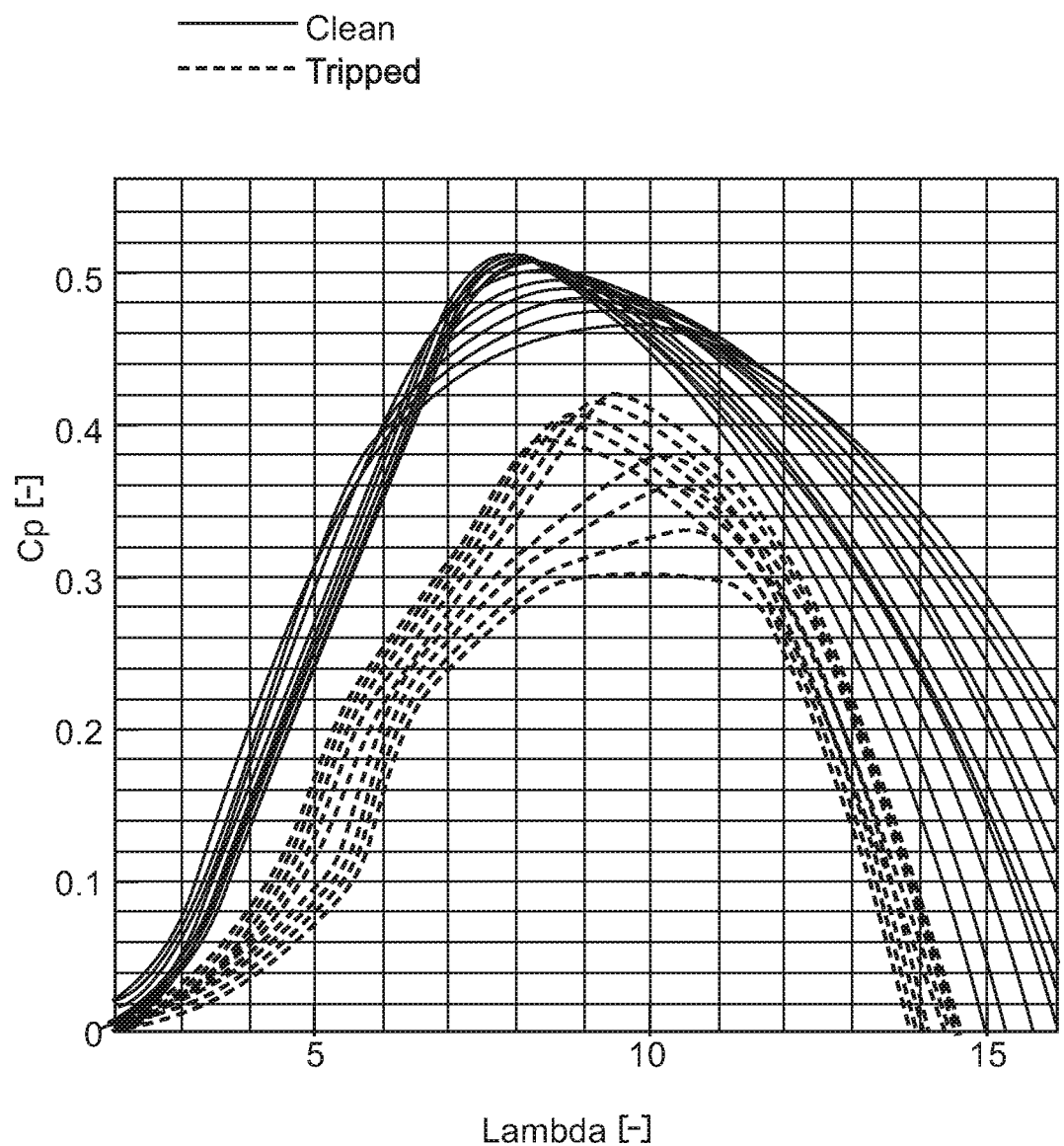
FIG. 6a shows a schematic view of the influence of blade soiling in the case of low incoming flow turbulence.
Figure 6B:
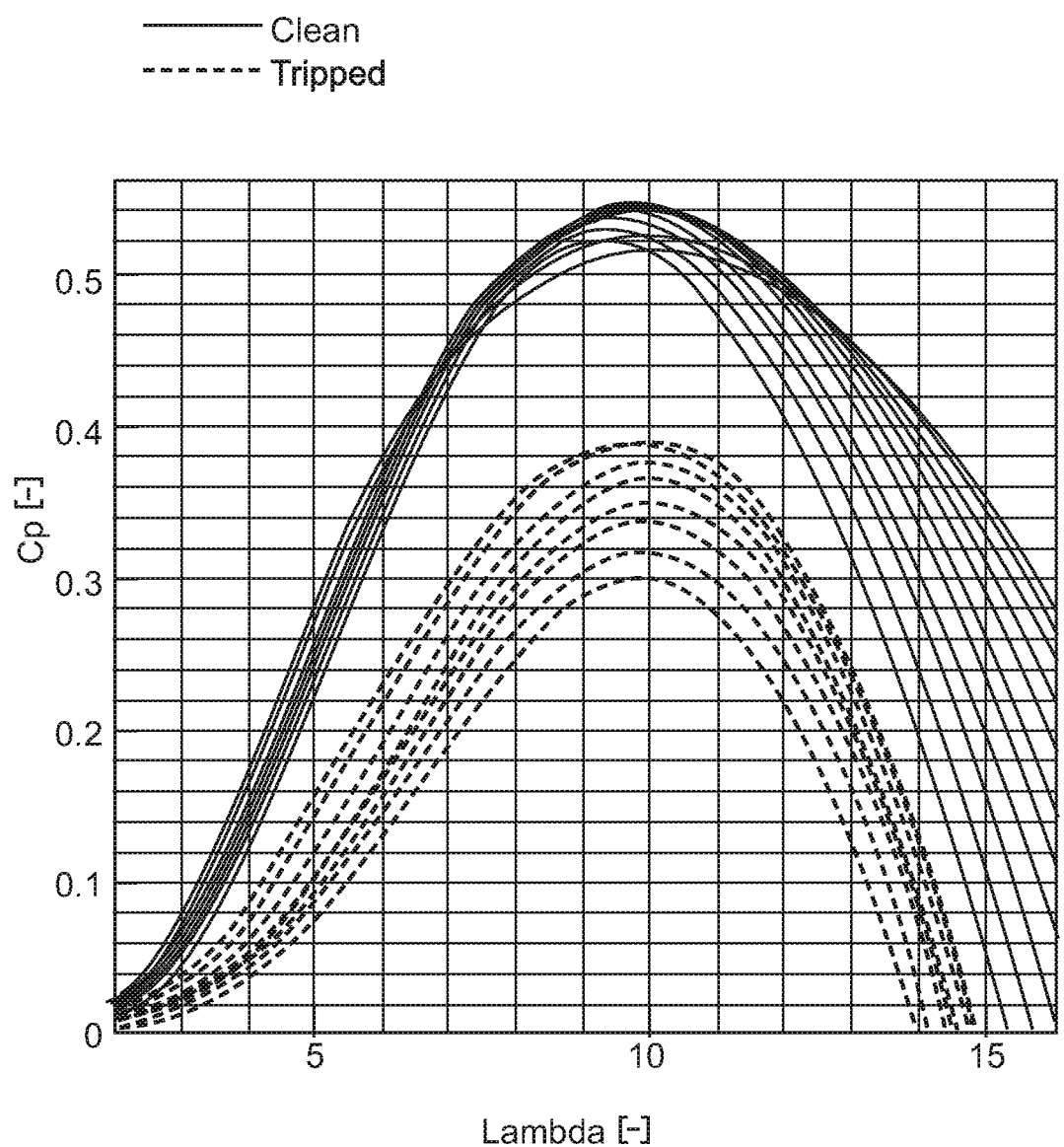
FIG. 6b shows a schematic view of the influence of blade soiling in the case of relatively high inflowing turbulence.

FIGS. 6a and 6b show the profiles of the power coefficient plotted against the tip speed ratio schematically and by way of example for various respective pitch angles, wherein the values of a clean rotor blade are illustrated by unbroken lines and those of a soiled rotor blade by dashed lines. FIG. 6a shows the profiles for low turbulence intensity, while, in contrast with this, the profiles for relatively high turbulence intensity are shown in FIG. 6b.

It can be seen that, of course, the maximum power coefficients for soiled blades lie clearly below the values for non-soiled rotor blades irrespective of the turbulence intensity.

However, it has been shown that the distance between the tip speed ratios at which the power optimum is reached for a clean rotor blade and for a soiled rotor blade depends on the turbulence intensity. While this distance tends to be large in the case of low turbulence intensity, cf., FIG. 6a, it is significantly lower in the case of relatively high turbulence intensity, cf., FIG. 6b. It has also been shown that the power optimum migrates toward relatively high tip speed ratios and pitch angles as the inflowing turbulence increases. All of these realizations, in particular including the rotor blade soiling, are preferably used by the wind turbine 100 for the purpose of adjustment, in order to achieve optimum operation of the system.

The invention claimed is:

1. A method for controlling a wind turbine, comprising:
operating the wind turbine according to a first operating point, wherein the first operating point is determined at least by a pitch angle and a tip speed ratio, wherein the first operating point corresponds to a maximum power coefficient, and
in a partial load range, operating the wind turbine at a second operating point which differs from the first operating point with the maximum power coefficient,
wherein a distance of the second operating point from the first operating point with the maximum power coefficient is set in accordance with a measured turbulence measure and with a degree of rotor blade soiling.

2. The method as claimed in claim 1, wherein the measured turbulence measure comprises a turbulence intensity.

3. The method as claimed in claim 1, wherein a higher measured turbulence measure corresponds to a higher distance of the second operating point from the first operating point with the maximum power coefficient.

4. The method as claimed in claim 1, wherein at least one of a pitch angle or a tip speed ratio of the second operating point is increased with respect to the first operating point with the maximum power coefficient.

5. The method as claimed in claim 4, wherein the tip speed ratio of the second operating point is controlled by controlling rotational speed, torque, or both.

6. The method as claimed in claim 1, wherein the maximum power coefficient improves when a gust of wind occurs.

7. The method as claimed in claim 1, wherein the turbulence measure is measured in real time.

8. The method as claimed in claim 7, wherein 15-second mean values of the turbulence measure are made available in real time.

9. The method according to claim 1, further comprising controlling the wind turbine in accordance with a measured wind shear.

10. The method as claimed in claim 9, wherein the wind turbine is controlled in accordance with the measured wind shear and the measured turbulence measure taking into account a time of day.

11. The method as claimed in claim 1, wherein the turbulence measure is measured with spatial resolution over a rotor of the wind turbine.

12. The method as claimed in claim 1, wherein the second operating point is set taking into account acoustic boundary conditions.

13. A wind turbine, wherein the wind turbine is a pitch-controlled wind turbine with a variable rotational speed, the wind turbine comprising:
- a turbulence sensor configured to measure a turbulence measure; and
- a controller configured to control the wind turbine,
- wherein the controller is configured to operate the wind turbine according to an operating point, wherein the operating point is determined at least by a pitch angle and a tip speed ratio,
- wherein a first operating point corresponds to a maximum power coefficient,
- wherein, in a partial load range, the controller is configured to operate the wind turbine at a second operating point which differs from the first operating point with the maximum power coefficient,
- wherein the controller is configured to set a distance of the second operating point from the first operating point with the maximum power coefficient in accordance with the turbulence measure which is measured by the turbulence sensor, and
- wherein the controller is further configured to set the distance of the second operating point from the first operating point with the maximum power coefficient is set in accordance with a degree of rotor blade soiling.

14. The wind turbine as claimed in claim 13, wherein the turbulence sensor is configured to measure a turbulence intensity.

* * * * *